United States Patent
Depew et al.

(10) Patent No.: US 8,368,329 B1
(45) Date of Patent: Feb. 5, 2013

(54) METHOD AND APPARATUS FOR IMPROVED COOLING FANS

(75) Inventors: John M. Depew, Sunnyvale, CA (US); Mike Culbert, Monte Serreno, CA (US); Keith Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1727 days.

(21) Appl. No.: 10/661,737

(22) Filed: Sep. 11, 2003

(51) Int. Cl.
*H02P 1/04* (2006.01)

(52) U.S. Cl. ............................ 318/272; 318/445; 417/22

(58) Field of Classification Search .......... 318/268–272, 318/254, 811, 599, 463, 445; 702/147; 324/160–168; 417/22
See application file for complete search history.

(56) References Cited

U.S. PATENT DOCUMENTS

| | | | | |
|---|---|---|---|---|
| 3,757,183 A * | 9/1973 | Nola | | 318/254 |
| 4,056,762 A * | 11/1977 | Schadlich | | 318/484 |
| 4,228,396 A * | 10/1980 | Palombo et al. | | 324/163 |
| 4,743,848 A * | 5/1988 | Krimm et al. | | 324/772 |
| 4,808,894 A * | 2/1989 | Mizuta | | 318/266 |
| 5,069,000 A * | 12/1991 | Zuckerman | | 49/28 |
| 5,327,059 A * | 7/1994 | Truong et al. | | 318/632 |
| 5,591,017 A * | 1/1997 | Dwyer | | 417/366 |
| 5,838,124 A * | 11/1998 | Hill | | 318/269 |
| 6,188,189 B1 * | 2/2001 | Blake | | 318/471 |
| 6,407,522 B1 * | 6/2002 | Andersson et al. | | 318/430 |
| 6,480,130 B1 * | 11/2002 | Hanson et al. | | 341/144 |
| 6,528,987 B1 * | 3/2003 | Blake et al. | | 324/168 |
| 6,643,128 B2 * | 11/2003 | Chu et al. | | 361/687 |
| 6,650,074 B1 * | 11/2003 | Vyssotski et al. | | 318/254 |
| 6,762,577 B2 * | 7/2004 | Gray et al. | | 318/268 |
| 6,778,938 B1 * | 8/2004 | Ng et al. | | 702/147 |
| 6,779,981 B2 * | 8/2004 | Huang et al. | | 417/42 |
| 6,813,150 B2 * | 11/2004 | King et al. | | 361/687 |
| 6,824,362 B2 * | 11/2004 | Dodson, III | | 417/22 |
| 6,894,402 B2 * | 5/2005 | Dubus et al. | | 290/40 C |
| 2003/0011332 A1 * | 1/2003 | Mays, II | | 318/254 |

OTHER PUBLICATIONS

Analog Devices, Whitepaper, "Intelligent Temperature Monitor and PWM Fan Controller", 2001, 28 pages, Analog Devices, Inc., One Technology Way, P.O. Box 9106.

* cited by examiner

*Primary Examiner* — Rita Leykin
(74) *Attorney, Agent, or Firm* — Blakely, Sokoloff, Taylor & Zafman LLP

(57) ABSTRACT

Methods and apparatuses for improving cooling fan operation are disclosed. In one embodiment, a cooling fan's speed is maximized by adjusting a PWM signal driving the fan to change the switching point of the fan motor. In another embodiment, a method for starting a low speed cooling fan by incrementally increasing the amplitude of the PWM signal applied to the fan is disclosed. In a further embodiment, a method for controlling a fan and a fan sensor is disclosed. In this embodiment, a PWM signal is generated, a fan is driven using the PWM signal, a cycle of the PWM signal is modified, and the fan sensors is driven using the PWM signal during the cycle. In a further embodiment, a fan incorporating these improvements is disclosed.

18 Claims, 8 Drawing Sheets

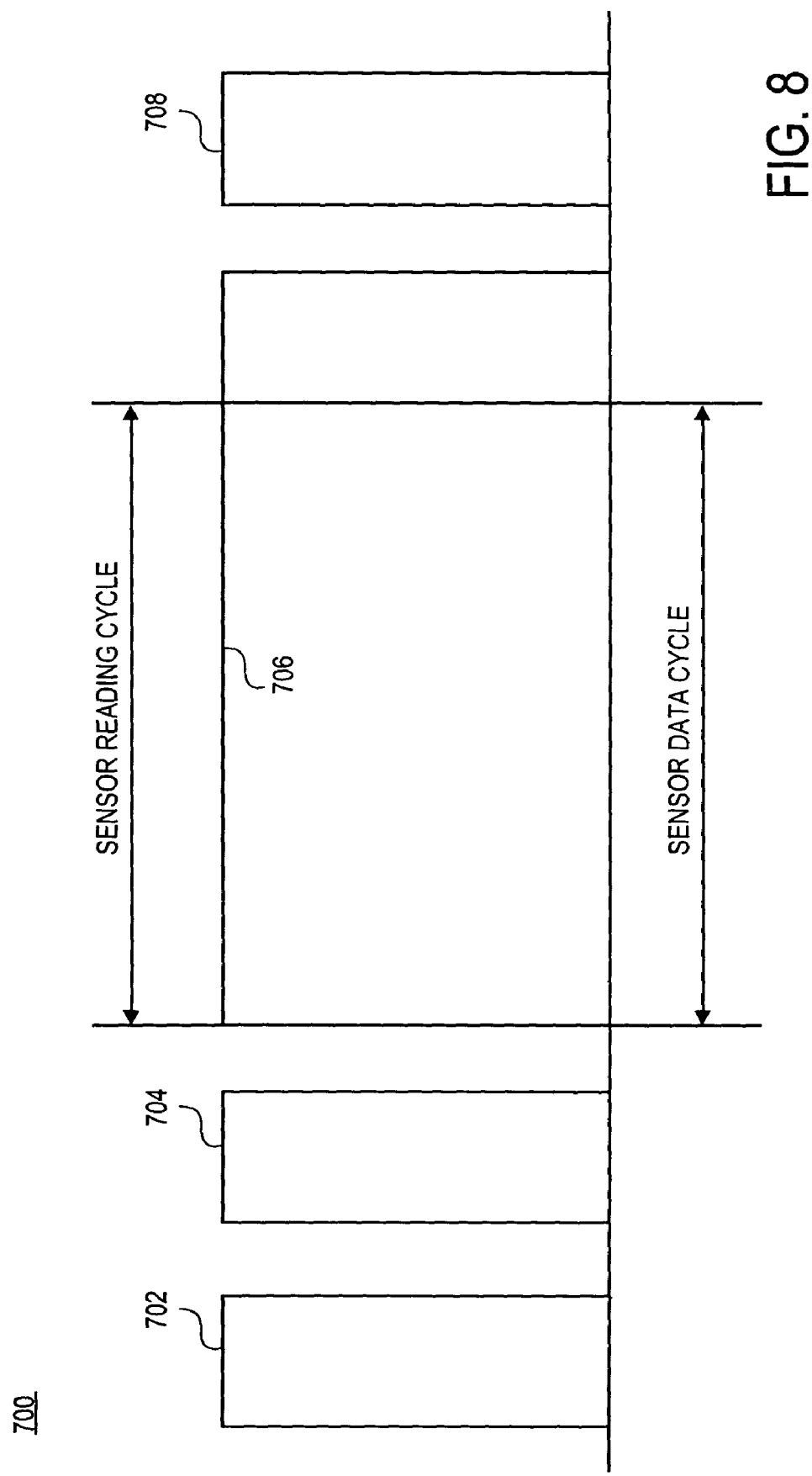

METHOD AND APPARATUS FOR IMPROVED COOLING FANS

FIELD OF THE INVENTION

This invention relates to heat management. More specifically, this invention relates to heat management in computer systems.

BACKGROUND

Electronic devices, including integrated circuits (ICs) and computer systems, can produce enough heat during their operation to cause malfunctions. Modern electronic devices typically require cooling fans to remove heat and reduce operating temperatures. Computer systems today typically use one or more cooling fans to cool microprocessors, power supplies, other components within a computer chassis, etc. Cooling fans used in computer systems can be controlled by the computer system. These fans can be turned on and off at certain times, and the computer system can regulate their speed to reduce noise or increase airflow as necessary. One significant disadvantage of cooling fans is noise. While the ICs and other components that comprise computer systems tend to be silent in their operation, it is the cooling fans that create noise.

A cooling fan typically comprises an electric motor coupled with one or more fan blades. The motor may be driven using any one of several different types of electronic signals. For example, the motor may be a direct current (DC) motor that can be driven by an analog DC signal. FIG. 1A illustrates a constant 2.5-volt analog DC signal. The graph 10 shows a voltage over time. The analog signal 12 drives the cooling fan using a constant 2.5-volts. If a fan is driven using a signal 12, the fan will rotate at a constant speed, for example, 1000 revolutions per minute (RPM). The actual speed of a fan at a given voltage will depend on the motor design. The fan speed can be increased by increasing the voltage driving the fan, or the fan speed can be reduced by reducing the voltage driving the fan. For example, if the same fan were driven at 1.25-volts, the fan might rotate at a constant 500 RPM.

The signal 12 is an analog signal that can have an infinitely variable value. In some instances is may be desirable to use a digital signal to drive the fan. A digital signal can be generated by the computer system directly without having to use additional circuitry to output an analog signal. FIG. 1B illustrates an outputted digital high signal. A binary digital signal may only have two values: a logical "high" or a logical "low." For example, the logical high value may be 5-volts, while the logical low value may be 0-volts or ground. The outputted signal 22 as shown in the graph 20 is a logical high signal, or 5-volts. So, using the same fan as above, if the fan were powered by a logical high signal, the fan would rotate at a speed of 2000 RPM. Unfortunately, the speed would be invariable, since the fan would either not turn or rotate at 2000 RPM, since the only possible outputs of a digital signal are high or low.

If a user wishes to drive the fan at a speed between the full speed at five volts and zero RPM using a digital signal, the user can use a pulse width modulation (PWM) signal. FIG. 1C illustrates a pulse width modulation signal. A PWM signal is a digital signal that varies over time, normally varying by the length of time in which the signal remains in a high or low state. For example, a PWM signal might go high for five milliseconds, then low for five milliseconds, then high again for another five milliseconds, etc. By switching between the high and low signal, an average voltage between that of the low and the high signal can be obtained. In the previous example, the fan would be driven at a 50% duty cycle, or 50% of the high value, or 2.5-volts. The graph 30 shows an outputted PWM signal 32 that can be used to drive a cooling fan. If the computer system driving the cooling fan uses a 5-volt signal for a digital high signal, then the PWM signal 32 will effectively drive the cooling fan as if it were a 2.5-volt analog signal, such as analog signal 12. The PWM signal 32 is operating at a 50% duty cycle. The PWM signal 32 can be modified so that it drives a cooling fan at any speed by changing the amount of time that the signal is high. For example, the signal 32 could be high for 3 cycles and low for 1 cycle, which would result in a 75% duty cycle, or approximately 3.75 volts. Thus, if a cooling fan driven at five volts were rotating at 2,000 RPM, the cooling fan driven by the PWM signal 32 would operate at 1000 RPM, and a fan being driven by the 75% PWM signal would operate at 1500 RPM. A digital system can easily control this output to change the speed of the cooling fans at any time without using cumbersome analog circuits.

Often it is not necessary to run fans at their full operational speed, and a computer system can determine the airflow needed using chassis thermometers. Running fans at excessive speeds not only unnecessarily consumes energy, which can be critical in portable computer applications that have limited battery life, but also creates excessive noise, which can be annoying to users. A signal applied to a fan to run it at a low speed may be insufficient to start the fan, because the static friction at the fan spindle may be too high to overcome at a low speed. Therefore, computer systems typically start cooling fans by driving the fan at a 100% duty cycle, or maximum speed, to overcome the static friction. However, running a fan at full speed is very noisy and can be unsettling, especially when a fan is started after a long period of inactivity. Also, PWM signals driving fans can cause clicking and chatter in the fan because the PWM signal may cause a fan motor to switch at inefficient times, therefore rocking the motor along the fan spindle.

Fan speed sensors, such as tachometers or Hall Effect sensors, are often attached to cooling fans to monitor their status. However, these fan speed sensors typically are powered using a high logical signal, or a 100% PWM signal. Therefore, fan speed sensors must typically be powered independently of the remainder of the fan, which requires extra wiring. This extra wiring can create unnecessary complexity and increased battery consumption because the sensor is always on, even though a sensor reading is not always needed.

SUMMARY

Methods and apparatuses for improving cooling fan operation are disclosed. In one embodiment, a PWM signal is applied to a fan to drive the fan, a fan speed sensor is read to obtain a speed signal indicating a the speed of the fan, and the PWM signal is adjusted until the speed of the fan is maximized according to the speed signal. In another embodiment, a method for starting a low speed cooling fan is disclosed. In this embodiment a PWM signal is applied at a desired rate to the cooling fan, a speed sensor coupled with the cooling fan is read, it is determined whether the cooling fan is moving according to the speed sensor, and if the cooling fan is not moving, the PWM signal is incrementally increased until the cooling fan begins moving, and after the fan begins moving the PWM signal is restored to the desired rate. In a further embodiment, a method for controlling a fan and a fan sensor is disclosed. In this embodiment, a PWM signal is generated, a fan is driven using the PWM signal, a cycle of the PWM signal is modified, and the fan sensor is driven using the PWM signal during the cycle. In a further embodiment, a fan incorporating these improvements is disclosed, and a computer system with a fan is also disclosed and a computer system with a fan is also disclosed.

BRIEF DESCRIPTION OF THE DRAWINGS

FIG. 8 illustrates a PWM signal having been modified to drive an RPM sensor.

DETAILED DESCRIPTION

Described herein are methods and apparatuses for improved cooling fans. In the following description, numerous specific details are set forth. However, it is understood that embodiments may be practiced without these specific details. For example, well known equivalent components may be used in place of those described herein. In other instances, well known components have not been shown in detail in order not to obscure the understanding of this description.

Cooling fans tend to be the noisiest component in a computer or other electronic system. The noise caused by the fans increases with increased fan speed. This noise can be irritating to a user, and therefore it is desirable to reduce the amount of noise created by the fan by reducing the speed of the fan. A constant, low speed-cooling fan typically produces a small amount of ambient noise. Further, because the noise is constant, a user is less likely to notice the noise. A constant on and off cycling of fans, especially to the full speed of the fan can distract a user, as well as create unnecessary wear. Therefore, it is desirable to drive fans at low speeds using PWM signals. However, using PWM signals may leave fans unsynchronized, causing unnecessary noise, including clicks and buzzes. Also, the static friction force created by the fan's bearings may make it impossible for a low duty cycle PWM signal to start the fan. Further, the fan sensor, which is used to implement many fan control methods, cannot be driven by a low duty cycle PWM signal. In one embodiment, a PWM signal is synchronized to maximize the speed of the fan in order to reduce the amount of the noise and increase the fan efficiency. In another embodiment, a PWM signal is generated to drive a fan, and if the PWM signal is insufficient to start the fan, the signal is incrementally increased until the fan is started, and then the signal is returned to its original value. In a further embodiment, a PWM signal to drive a fan is modified so that it can drive a fan sensor as well. By employing these embodiments, fan noise will be reduced, and fan efficiency will be increased while still a maintaining a necessary amount of fan airflow.

Figure 1A:
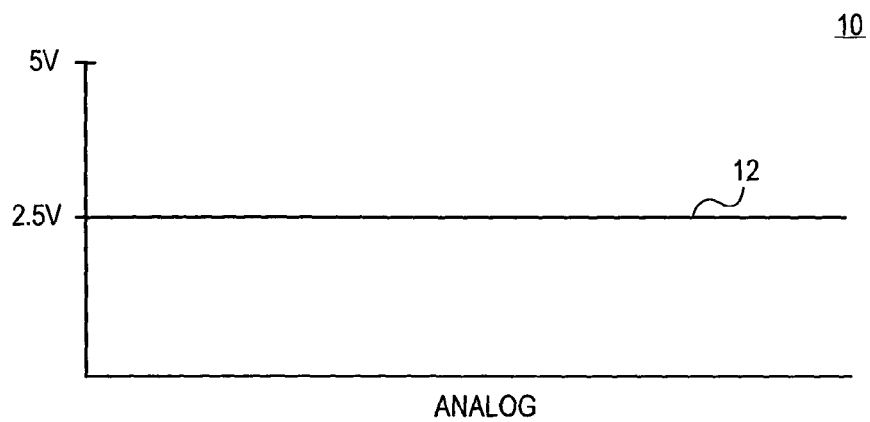
FIG. 1A illustrates a constant 2.5-volt analog DC signal.
Figure 1B:
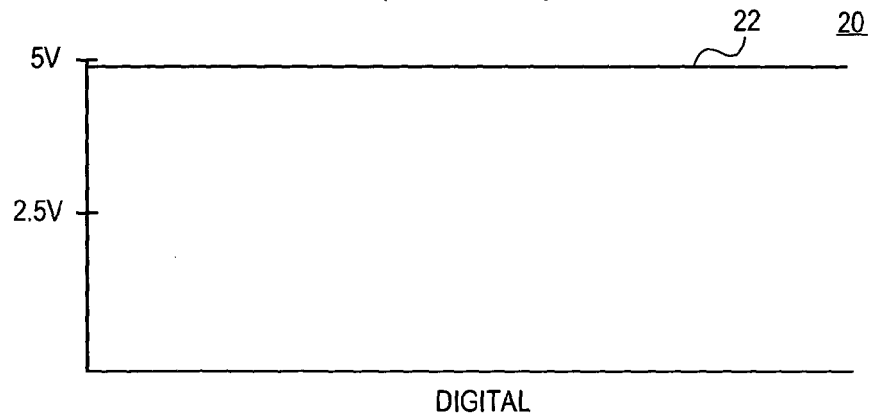
FIG. 1B illustrates an outputted digital high signal.
Figure 1C:
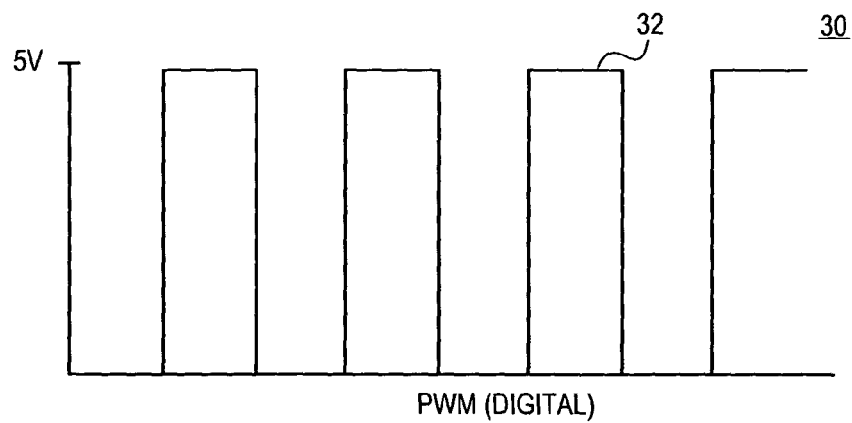
FIG. 1C illustrates a pulse width modulation signal.
Figure 2:
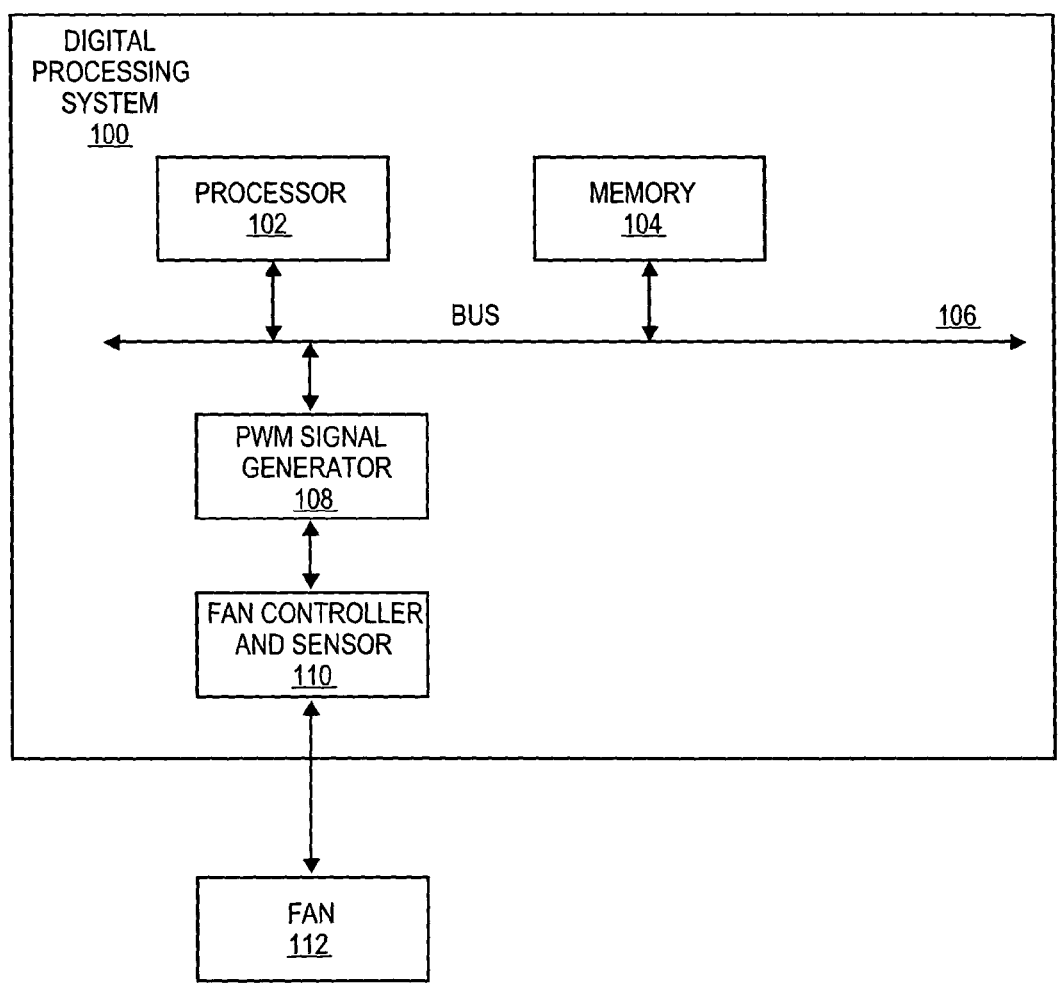
FIG. 2 is a block diagram of a digital processing system that may require and may be used to operate a cooling fan, in accordance with one embodiment.

FIG. 2 is a block diagram of a digital processing system that may require and may be used to operate a cooling fan, in accordance with one embodiment. For example, the digital processing system 100 may be a computer, such as a computer running a Macintosh™ or Windows™ operating system, or other electronic device that requires a cooling fan. The digital processing system 100 includes a processor 102, which may represent one or more processors, which may include one or more conventional types of processors such as an IBM or a Motorola™ Power PC™ processor, an Intel™ x86 processor, etc. A memory 104 is coupled to the processor 102 by a bus 106. The memory 104 includes one or more of a semiconductor random access memory (RAM) (e.g., dynamic RAM (DRAM)), a hard drive, and a read only memory (ROM). The memory 104 can store computer program instructions for operating the computer system, include program instructions for enabling and controlling operation of the PWM signal generator 108. The bus 106 further couples the processor 102 to a PWM signal generator 108. The PWM signal generator 108 can generate signals to drive a cooling fan or other components. The PWM signal generator 108 can be receive instructions from the processor 102, and according to those instructions can generate an appropriate signal. A fan controller and sensor 110 is coupled with the PWM signal generator 108. The fan controller and sensor 110 can control and sense parameters of a fan 112. The fan controller and sensor 110 can be integrated within the fan 112 or may be part of the digital processing system 100. The fan controller 110 accepts signals outputted by the PWM signal generator and drives the fan's 112 motor using the signals. The sensor portion of fan controller and sensor 110 may include a Hall effect sensor which is discussed below. It is understood that several other devices, including storage devices, peripheral devices, displays, etc., may also be used with or be a part of the digital processing system 100.

Figure 3B:
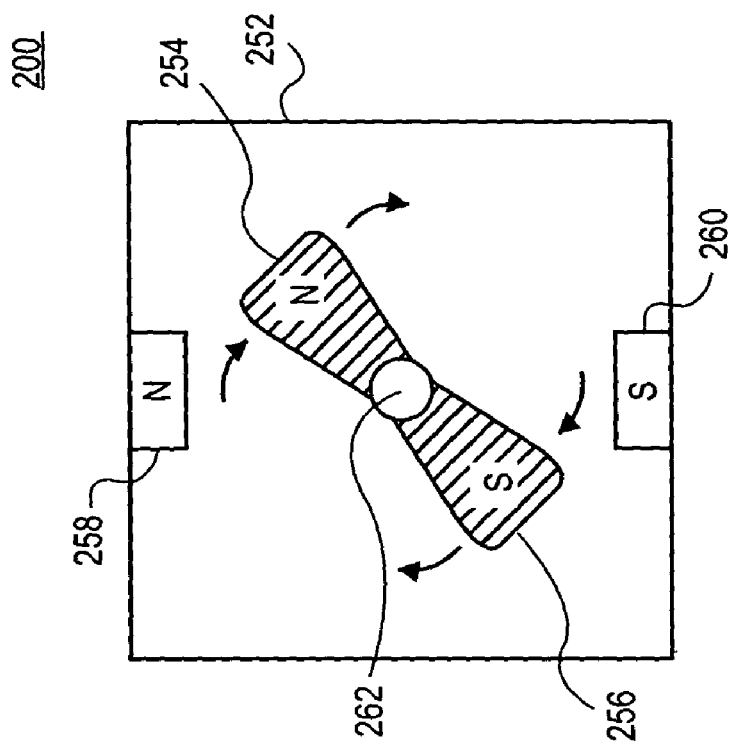
FIGS. 3A and 3B illustrate a fan motor switching at different times.
Figure 3A:
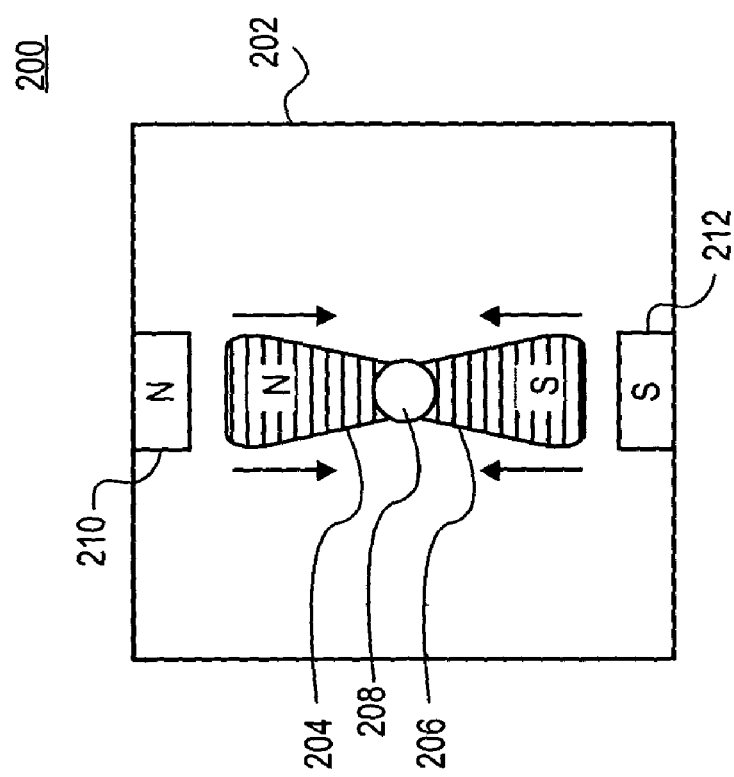

FIGS. 3A and 3B illustrate a fan motor switching at different times. In FIG. 3A, the fan 200 switches when the motor's poles are directly opposite the motor's magnets. A fan, such as the fan 200, typically has a fan blade attached to an electric motor. The fan assembly is housed in a chassis 202. The fan displayed here uses a two-pole motor for simplicity. However, it is understood that the motor may also have three or more poles. The motor operates by causing the two poles 204 and 206 to rotate about an axis 208. A fan blade is attached to the axis 208. The two poles 204 and 206 are energized to create electromagnets. Two permanent magnets 210 and 212 having opposite polarity are housed within the chassis 202. The permanent magnets 210 and 212 will attract or repel the poles 204 and 206, causing the fan 200 to rotate. However, if the polarity of the poles 204 and 206 remains constant, the poles 204 and 206 will eventually stop rotating, because the poles will come to rest opposite the corresponding magnets of opposite polarity. In order to maintain rotation of the motor, the poles 204 and 206 must switch polarity after they have passed through the magnets 210 and 212. As shown in FIG. 3A, the poles 204 and 206 have recently switched, while they are parallel with the edge of the chassis 202. The pole 204 will be repelled by the magnet 210, since the pole 201 and the magnet 208 both have a northern polarity. However, because the pole 204 has been switched while it is passing the magnet 208, there will be a force pushing inward toward the axis 208 which will cause the poles 204 and 206 to rock against the bearings inside the axis 208. This will create a clicking sound, and will slow the fan because some of the energy created by the motor is being consumed by the noise. Ideally, all of the energy created by the motor would be translated into the rotational motion of the fan. There will be some point where the motor can switch where the maximum amount of energy imparted to the poles will translate into rotational motion. This point will be after the poles 204 and 206 have passed the magnets 210 and 212.

FIG. 3B illustrates a fan having a motor that switches after the poles have passed through the magnets. As above, the fan is housed in a chassis 252. However, the poles 254 and 256 are shown switching after they have passed through the magnets 258 and 260. Since the poles 254 and 256 have already passed through the magnets 258 and 260, much less energy will be transferred inward toward the axis 262, and instead the energy will be used to rotate the motor. Therefore, it is desirable to have the fan 250 switch the polarity of the poles 254 and 256 at a point after the poles 254 and 256 pass through the magnets 258 and 260, as shown in FIG. 3B, in order to reduce the noise caused by the fan. The maximum speed of the fan using any given input signal will be the most efficient and least noisy operating speed. Given the same amount of energy, at the maximum speed the most energy will be converted into motion and the least energy will be converted into noise. Therefore, in order to reduce noise, the fan motor should be switched at a point where the speed of the fan is maximized.

Figure 4A:
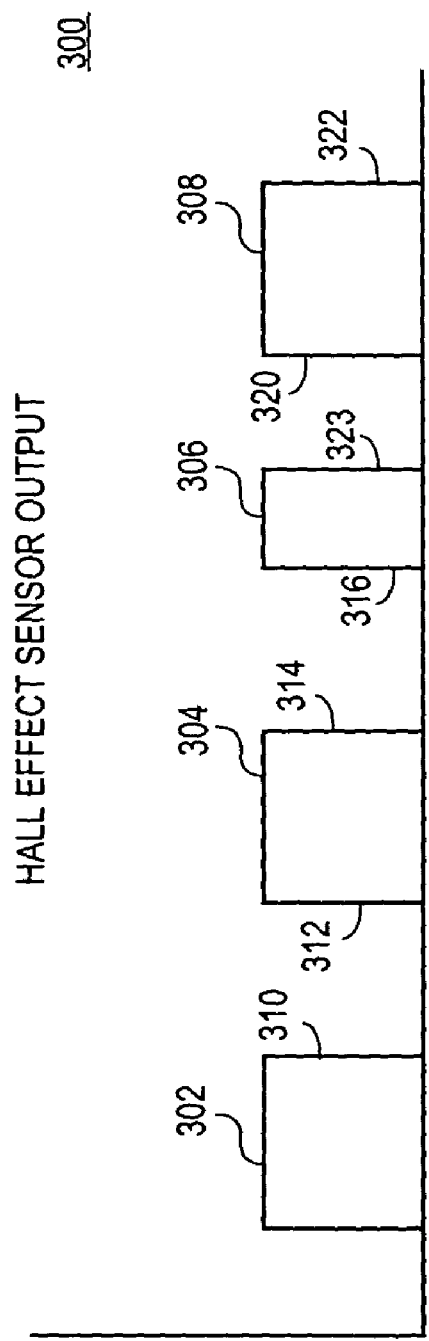
FIG. 4A illustrates the output of a Hall Effect sensor measuring the rotation of a fan.

A tachometer or Hall Effect sensor can measure the rotational speed of a rotating motor. FIG. 4A illustrates the output of a Hall Effect sensor measuring the rotation of a fan. The graph 300 illustrates the pulses 302, 304, 306, and 308 showing the output of the Hall Effect sensor. The pulses 302-308 indicate that a specific pole has passed the sensor having a specific polarity. The edge of each of the pulses 302-308 indicates that a pole has switched. For example, if the pulse 302 indicates that one of the poles of the motor has a northern polarity, then at the edge 310, the pole will switch to a southern polarity. Each of the edges 310-322 indicates that the motor has switched.

As can be seen in the graph 300, the fan whose speed is being measured has a six-pole motor. For any given fan, one pole is typically shorter than the others so that the number of poles and the position of a motor in a specific fan can be determined. Here, the short pulse 306 indicates that this is a six-pole motor, since every sixth pulse is shorter than the others. The edges 310-322 indicate a pole switch. Therefore, a PWM signal driving the fan can be manipulated to ensure that the motor switches after the poles pass through the magnets. In this way, a maximum speed for the fan can be found, and the noise created by the fan can be reduced. Once the ideal switching point for any given fan has been found, that point never need be determined again. For example, if a software component of a computer system were controlling a fan's speed, the software could determine the ideal switching point upon initial system startup, and retain that information as long as the fan is being used in the computer system.

Figure 4B:
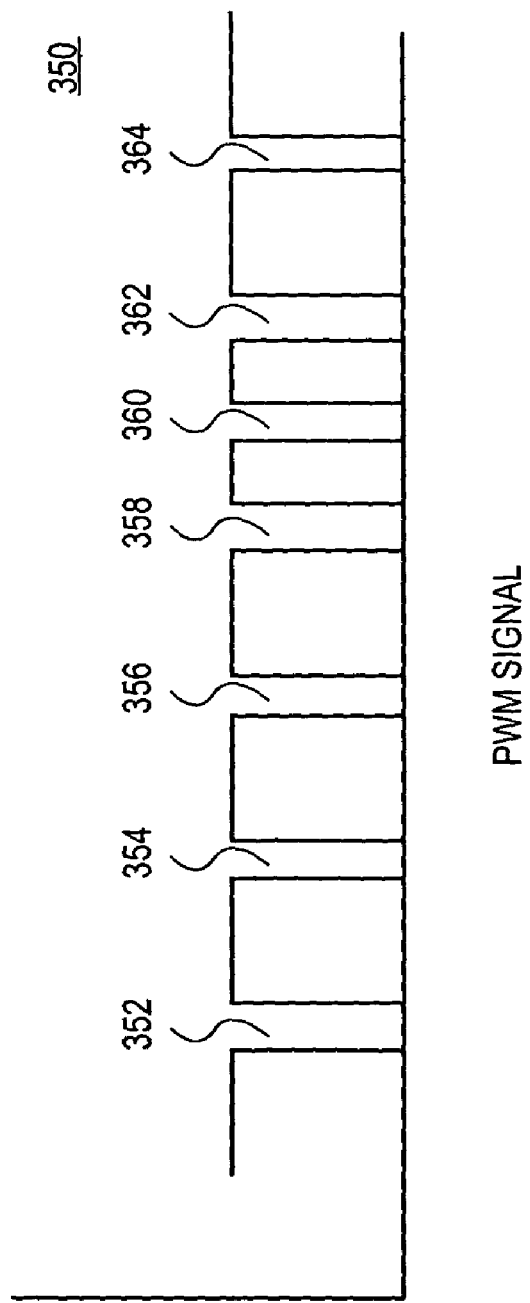
FIG. 4B illustrates a PWM signal used to drive a fan.

FIG. 4B illustrates a PWM signal used to drive a fan. The PWM signal can be modified so that the speed of the fan is maximized. The PWM signal can be modified by using the output of the Hall Effect sensor to determine where the maximum speed of the fan occurs. The pulses 352, 354, 356, 358, 360, 362, and 364 are inserted into the PWM signal in order to cause the fan motor to switch at a given point. The pulses momentarily drive the fan with a low signal, which can delay switching. As can be seen when comparing the graph 350 with the graph 300, the pulses 352-364 occur at the same time the motor switches at the edges 310-322. The pulses 352-364 can be moved earlier and later in time in order to change the time of switching. A computer system can modify the pulses 352-364 by moving them earlier and later in time until the Hall Effect sensor output 300 indicates that the fan is at its maximum speed. The maximum speed can be determined by examining the pulses 302-308 and finding the switching point which produces the shortest pulses 302-308. This is an iterative process, and once the pulses 302-308 indicate that the speed of the fan is maximized, the ideal switching position of the fan has been determined.

Computer systems also typically have multiple fans. In a system with multiple fans, beat frequencies can develop when two or more fans are rotating at similar, but not identical speeds. These beats can be especially loud and annoying. Because the speed of cooling fans can be variable and can be controlled by the computer system, it is possible to have two fans operating at similar, but not identical speeds. The system can monitor the status of the fans, and determine, according to a predetermined threshold, whether the several fans are in danger of developing beats. If the system determines that two or more fans have rotational speeds that are too similar, the system can change the speed of one to match the other(s). For example, if a system has two fans, and one is directed to operate at 500 RPM, and the other at 501 RPM, beat frequencies will likely develop. The system can instruct the second fan to operate at 500 RPM, in order to match the speed of the first fan and eliminate any noise relating to beat frequencies.

Figure 5:
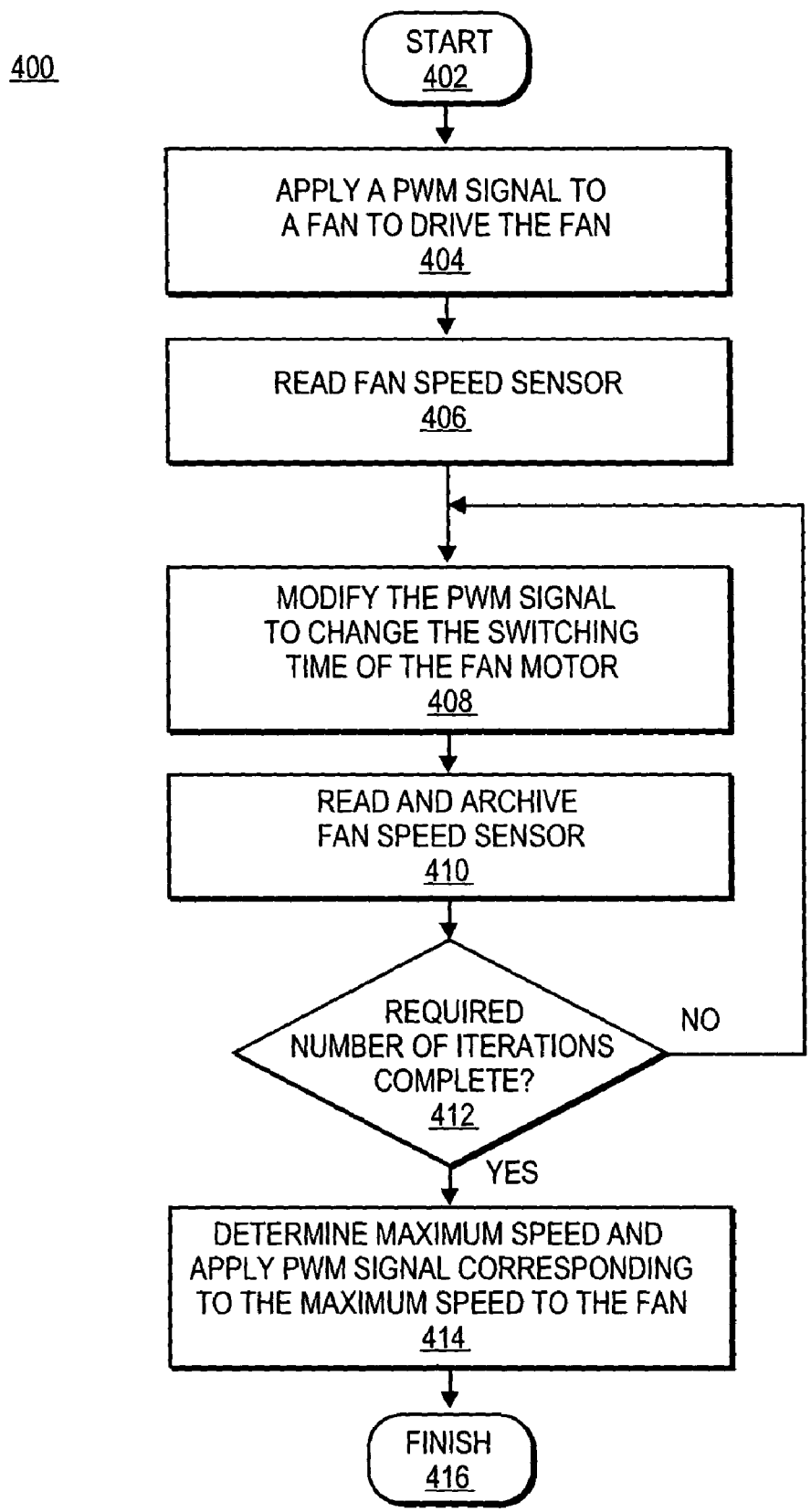
FIG. 5 illustrates an iterative process for maximizing the speed of a fan.

FIG. 5 illustrates an iterative process for maximizing the speed of a fan. The process 400 starts in the start block 402. In block 404, a PWM signal is applied to a fan to drive the fan. The PWM signal may drive the fan at a predetermined rate or the signal may be determined by a computer system in response to the system's cooling needs. In block 406, the computer system reads a fan speed sensor. As noted above, the fan speed sensor output can be used in conjunction with the PWM signal to determine an ideal switching point for the fan. In block 408, the PWM signal is modified to change the switching point of the fan motor. In block 410, the fan speed sensor determines the speed of the fan. The signal driving the fan and the resulting speed are then stored by the computer system to determine which PWM signal results in the maximum fan speed. In block 412, the system determines whether the required number of iterations has been completed. As above, a computer system can use an iterative process to determine the highest fan speed. The system can complete a predetermined number of iterations to ensure that the maximum speed has been found. If that number of iterations has not been completed, the process returns to block 408. Once the iterations have been completed, the process 400 moves on to block 414, where the PWM signal giving the maximum speed is chosen. The process 400 is finished in block 416.

Figure 6:
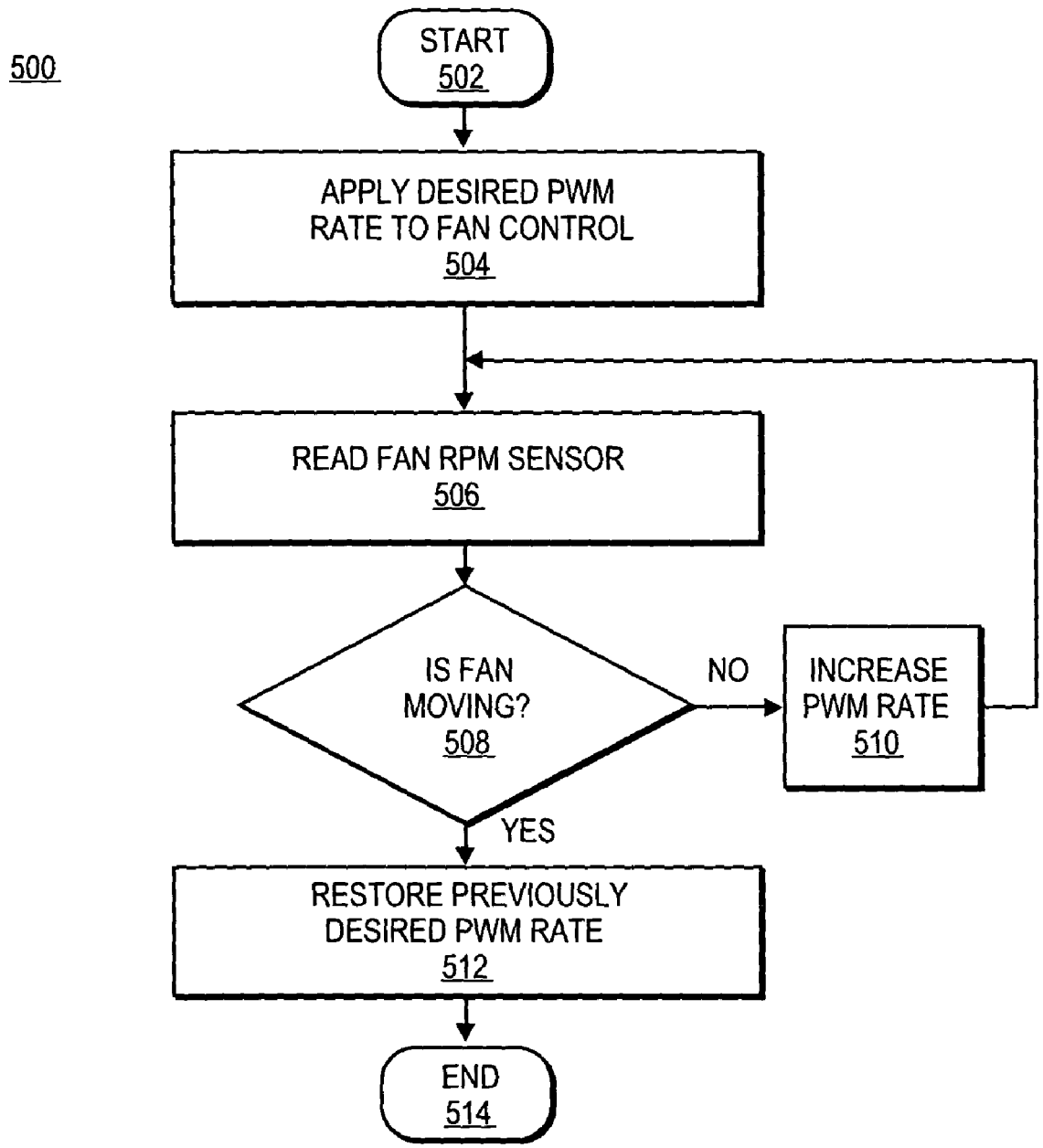
FIG. 6 illustrates a process for starting a low speed fan.

FIG. 6 illustrates a process for starting a low speed fan. It may be desirable to run a cooling fan at a constant low speed in order to minimize noise. In order to cool a system, some prior applications turn on a cooling fan at full speed in response to the system reaching a specified temperature. When the system reaches another, lower temperature, the fan is then turned off. This constant on and off cycling of the fan is noisy and causes unnecessary wear on the cooling fans. Instead, a cooling fan can be run at a constant low speed to provide adequate airflow and adequate cooling at all times. However, a certain amount of energy must typically be applied to the fan in order to overcome the static coefficient of friction of the motor. Typically, a signal given to drive a fan at a very low speed will be insufficient to overcome the static coefficient of friction. In order to start a low speed fan, prior systems typically start a fan at full speed for a given amount of time, and then reduce the speed to the desired speed. However, this is noisy and startling, especially when it happens after a long period of inactivity. The process 500 is a feedback process to increase the amplitude of the PWM signal until the static coefficient of friction is overcome, and once the static coefficient of friction is overcome and the fan begins spinning, the PWM signal can be returned to its desired rate.

The process 500 starts in start block 502. In block 504, a desired PWM rate is applied to a fan control. The desired PWM rate may be predetermined, or may be determined by the system based on its current cooling needs. In block 506, a fan RPM sensor is read. The fan RPM sensor may be a tachometer, Hall Effect sensor, etc. The fan RPM sensor will determine the speed of the fan. In block 508, it is determined whether the fan is moving. If the value read from the RPM sensor is greater than zero, it can be said that the fan is moving. If the fan is not moving according to the RPM sensor, in block 510 the PWM rate can be increased. The PWM rate can be increased by a predetermined rate, such as 5 or 10%. For example, a computer system may want to run a cooling fan at a 10% duty cycle, or 10% of its maximum speed. However, the 10% duty cycle may be insufficient to overcome the static coefficient of friction experienced at the motor. If, according to the RPM sensor, the fan is not moving, the computer system can then increase the PWM rate to 15%, for example. If it is determined the fan is still not moving after the fan RPM sensor is read again in block 506, the PWM rate can be increased again, such as to a 20% duty cycle. This process can continue in a loop until the RPM sensor determines that the fan is moving. Once it is determined that the fan is moving, the process moves on to block 512 where the previously desired PWM rate is restored. So, if the fan began moving when a 20% duty cycle was applied to the fan, the 10% duty cycle will be restored to the fan in block 512. At block 514, the process is complete.

A Hall Effect sensor or tachometer typically requires that an extra wire be attached to the fan to power the sensor. This extra wire can lead to increased complexity and manufacturing cost, and can also lead to increased power consumption, because although the sensor is typically always receiving power, the sensor data is not always needed. The sensor can be driven using the same PWM signal that drives the fan. However, if the PWM signal is a low amplitude signal driving a fan at a slow speed, the PWM signal will be insufficient to power the sensor when data is needed. In one embodiment, the PWM signal driving the fan can be partially modified to power the sensor. For example, the sensor may require one sample every five seconds. If the amount of time required to obtain a sensor reading is 500 milliseconds (ms), then the PWM signal would need to be modified so that one out of every ten 500 ms cycles of the PWM signal is running at 100% duty cycle to drive the sensor. This modification to the PWM signal will typically not materially affect the speed of the fan, since the modification occurs only during a small number of cycles. Further, the other cycles can be modified to achieve the desired fan speed.

Figure 7:
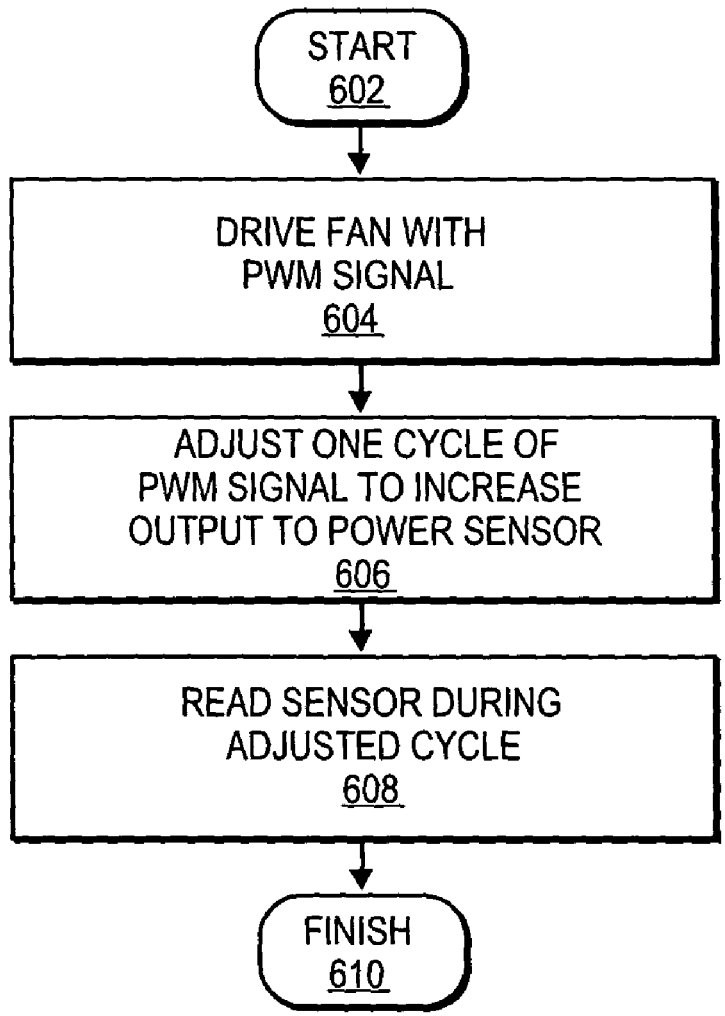
FIG. 7 illustrates a process for modifying a PWM signal to drive an RPM sensor.

FIG. 7 illustrates a process for modifying a PWM signal to drive an RPM sensor. The process 600 starts in start block 602. In block 604 a PWM signal is generated, and the cooling fan is driven with the PWM signal. In block 606, one cycle of the PWM signal is adjusted to increase the PWM output in order to power the sensor. In one embodiment, the cycle may be driven to 100% duty cycle to power the sensor. However, it may not always be necessary to deliver a full 100% duty cycle to the RPM sensor, depending on the power requirements of the sensor and the output level of the PWM signal. In block 608 the sensor is read during the adjusted cycle. Once the sensor has been read and the data has been obtained by the computing system, the process 600 is finished in block 610.

FIG. 8 illustrates a PWM signal having been modified to drive an RPM sensor. The graph 700 shows a PWM signal having pulses 702, 704, 706, and 708. As can be seen by looking at the pulses 702, 704, and 708, the normal PWM signal is driven at approximately a 66% duty cycle. The pulse 706 is a modified cycle that is driven at full duty cycle for a specified amount of time necessary to power the RPM sensor, as shown here, for approximately three cycles. The sensor data cycle 706 can have a variable length depending on the amount of time and the amount of power needed to satisfy the requirements of the RPM sensor. Once the sensor has been read, the PWM signal can return to normal and the signal can be modified again when the sensor needs to be read again. The modification of the signal may slightly increase the speed of the fan. However, this can be taken into account, and the duty cycle of the remaining pulses can be reduced, so that the cooling fan is driven at the desired speed. Typically, however, the increased speed will be unnoticeable, because of the relative infrequency of the modifications.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in the illustrative rather than in a restrictive sense.

What is claimed is:

1. A method for starting a low-speed cooling fan, comprising:
    applying a Pulse Width Modulation (PWM) signal at a desired rate to the cooling fan;
    reading a speed sensor coupled with the cooling fan;
    determining whether the cooling fan is moving according to the speed sensor, and if the cooling fan is not moving, incrementally increasing the PWM signal until the cooling fan begins moving, and after the fan begins moving restoring the PWM signal to the desired rate, which is insufficient to overcome an initial static force of the cooling fan but sufficient to keep the cooling fan running at a low speed in order to minimize noise.

2. The method of claim 1, further comprising controlling the PWM signal using a logic in a computer system.

3. The method of claim 2, wherein the cooling fan is a direct current (DC) powered fan in a portable computer.

4. The method of claim 1, wherein the desired rate is variable.

5. The method of claim 1, wherein the speed sensor is a tachometer.

6. The method of claim 5, further comprising powering the speed sensor independently of the cooling fan.

7. The method of claim 5, further comprising powering the speed sensor using the PWM signal.

8. A digital processing system, comprising:
    a digital processor;
    a memory coupled to said digital processor, the processor:
        applying a Pulse Width Modulation (PWM) signal at a desired rate to a cooling fan;
        reading a speed sensor coupled with the cooling fan;
        determining whether the cooling fan is moving according to the speed sensor, and if the cooling fan is not moving, incrementally increasing the PWM signal until the cooling fan begins moving, and after the fan begins moving restoring the PWM signal to the desired rate, which is insufficient to overcome an initial static force of the cooling fan but sufficient to keep the cooling fan running at a low speed in order to minimize noise.

9. The digital processing system of claim 8, further comprising controlling the PWM signal using a logic in a computer system.

10. The digital processing system of claim 9, wherein the cooling fan is a direct current (DC) powered fan in a portable computer.

11. The digital processing system of claim 10, wherein the desired rate is variable.

12. The digital processing system of claim 8, wherein the speed sensor is a tachometer.

13. The digital processing system of claim 12, further comprising the processor powering the speed sensor independently of the cooling fan.

14. The digital processing system of claim 12, further comprising the processor powering the speed sensor using the PWM signal.

15. A fan system, comprising:
a motor to drive a fan;
a power input coupled with the motor to drive the motor using a pulse width modulation (PWM) signal at a desired rate, wherein the desired rate is insufficient to overcome an initial static force of the fan but sufficient to keep the fan running at a low speed in order to minimize noise; and
a controller coupled to the power input, the controller configured to start the motor at a speed which is insufficient to move the motor and to increase the PWM signal to cause the motor to move and configured to set the PWM signal at the desired rate after the motor is moving.

16. The fan system of claim 15 further comprising a tachometer to measure a speed of the fan, wherein if the fan is not moving, the power input increases the PWM signal until the fan begins moving, and once the fan begins moving the PWM signal is festered set to the desired rate.

17. The fan system of claim 16, wherein a cycle of the PWM signal is modified to drive the tachometer.

18. The fan system of claim 17, wherein the PWM signal is driven to 100% during the cycle.

* * * * *